US009325590B2

(12) United States Patent
Iwaniszyn

(10) Patent No.: US 9,325,590 B2
(45) Date of Patent: *Apr. 26, 2016

(54) AUTOMATIC SWITCH-MAPPING AND CLIENT DEVICE LOCATION DETECTION

(71) Applicant: Guest Tek Interactive Entertainment Ltd., Calgary (CA)

(72) Inventor: Adam Iwaniszyn, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,187

(22) Filed: Apr. 6, 2015

(65) Prior Publication Data

US 2015/0215182 A1 Jul. 30, 2015

Related U.S. Application Data

(63) Continuation of application No. 13/462,662, filed on May 2, 2012, now Pat. No. 9,009,259.

(51) Int. Cl.
*G06F 15/167* (2006.01)
*G06F 15/177* (2006.01)
(Continued)

(52) U.S. Cl.
CPC .............. *H04L 43/065* (2013.01); *G06Q 30/04* (2013.01); *G06Q 50/12* (2013.01); *H04L 65/00* (2013.01); *H04L 67/18* (2013.01); *H04N 21/2143* (2013.01); *H04N 21/25841* (2013.01)

(58) Field of Classification Search
CPC ....... H04L 43/065; H04L 65/00; H04L 67/18; H04N 21/2143; H04N 21/25841; G06Q 50/12; G06Q 30/04
See application file for complete search history.

(56) References Cited

U.S. PATENT DOCUMENTS 6,636,894 B1 10/2003 Short et al.
7,194,552 B1 3/2007 Schneider
(Continued)

FOREIGN PATENT DOCUMENTS

CA 2707202 A1 12/2010

OTHER PUBLICATIONS

Nomadix, "HotSpot Gateway (HSG) Access Gateways User's Guide", Copyright 2003 (286 pages).
(Continued)

*Primary Examiner* — Larry Donaghue
(74) *Attorney, Agent, or Firm* — ATMAC Patent Services Ltd.; Andrew T. MacMillian

(57) ABSTRACT

An apparatus for automatic client device location detection includes a controller module configured to receive first network traffic transmitted on a computer network of a hospitality establishment from a known location within the hospitality establishment. The controller module is further configured to query one or more network components of the computer network to determine a source access-node from which the first network traffic originated, and store a mapping of the source access-node to the known location in the storage device. The controller module is further configured to receive second network traffic transmitted on the computer network by a client device at the hospitality establishment, query the one or more network components of the computer network to determine that the second network traffic originated from the source access-node, and automatically determine the client device to be at the known location according to the mapping in the storage device.

20 Claims, 7 Drawing Sheets

(51) Int. Cl.
*H04L 12/26* (2006.01)
*H04L 29/06* (2006.01)
*H04N 21/214* (2011.01)
*H04N 21/258* (2011.01)
*G06Q 30/04* (2012.01)
*G06Q 50/12* (2012.01)
*H04L 29/08* (2006.01)

(56) References Cited

U.S. PATENT DOCUMENTS

| | | | |
|---|---|---|---|
| 7,194,554 | B1 | 3/2007 | Short et al. |
| 7,197,556 | B1 | 3/2007 | Short et al. |
| 7,689,716 | B2 | 3/2010 | Short et al. |
| 8,244,886 | B2 | 8/2012 | Short et al. |
| 8,266,269 | B2 | 9/2012 | Short et al. |
| 9,009,259 | B2 * | 4/2015 | Iwaniszyn ............... H04L 65/00 709/712 |
| 2003/0216144 | A1 | 11/2003 | Roese et al. |
| 2007/0038570 | A1 | 2/2007 | Halbritter et al. |
| 2008/0031185 | A1 | 2/2008 | Bims |
| 2010/0329443 | A1 | 12/2010 | Montaner Gutierrez et al. |
| 2011/0159818 | A1 | 6/2011 | Scherzer et al. |
| 2011/0197237 | A1 | 8/2011 | Turner |
| 2011/0314497 | A1 | 12/2011 | Warrick et al. |
| 2011/0314502 | A1 | 12/2011 | Levy et al. |
| 2012/0089713 | A1 | 4/2012 | Carriere |

OTHER PUBLICATIONS

Nomadix, "AG 3000 Access Gateways User's Guide", Copyright 2005 (336 pages).
Nomadix, "Access Gateway Version 7.4/8.0 User Guide", Copyright 2012 (356 pages).
Office action dated Jan. 30, 2015 issued by Canadian Intellectual Property Office for counterpart Canadian App. No. 2,813,906 (4 pages).

* cited by examiner

Updating port-to-switch mappings

Access-node mapping table (126)

| Network device | Port | Destination |
|---|---|---|
| Switch A | 1 | <> |
| | 2 | <> |
| | 3 | Switch B |
| | 4 | Switch C |
| | 5 | Switch D |
| | 6 | <> |
| Switch B | 1 | Switch A |
| | 2 | <> |
| | 3 | <> |
| | 4 | <> |
| | 5 | <> |
| Switch C | 1 | Switch A |
| | 2 | <> |
| | 3 | <> |
| | 4 | <> |
| | 5 | <> |
| Switch D | 1 | Switch A |
| | 2 | <> |
| | 3 | <> |
| | 4 | <> |
| | 5 | <> |
| | 6 | <> |
| Switch E | 1 | Switch D |
| | 2 | <> |
| | 3 | <> |
| | 4 | <> |
| | 5 | <> |
| ... | ... | ... |

Port destination found to be "Switch E" → store mapping

Access-node mapping table (126)

| Network device | Port | Destination |
|---|---|---|
| Switch A | 1 | <> |
| | 2 | <> |
| | 3 | Switch B |
| | 4 | Switch C |
| | 5 | Switch D |
| | 6 | <> |
| Switch B | 1 | Switch A |
| | 2 | <> |
| | 3 | <> |
| | 4 | <> |
| | 5 | <> |
| Switch C | 1 | Switch A |
| | 2 | <> |
| | 3 | <> |
| | 4 | <> |
| | 5 | <> |
| Switch D | 1 | Switch A |
| | 2 | <> |
| | 3 | <> |
| | 4 | <> |
| | 5 | <> |
| | 6 | Switch E |
| Switch E | 1 | Switch D |
| | 2 | <> |
| | 3 | <> |
| | 4 | <> |
| | 5 | <> |
| ... | ... | ... |

FIG. 3

● Web browser

[←] [→] [×] [↻]  http://server/network-mapping-tool

1. Port-to-switch mappings —702                                          700

Stored network components in database not found during scan:
   Delete
      ☐ 10.143.115.101 - (non-existent switch)

New network components found during scan:
   Add
      ☑ Device 10.143.115.14, port 26 > found new switch 10.143.115.22
      ☑ Device 10.143.115.6, port 24 > found new switch 10.143.115.14

Stored mappings in database not found during scan:
   Delete
      ☐ No path from switch 10.143.115.6, port 568 > switch 10.143.115.11

New mappings found during scan:
   Add
      ☑ New path from switch 10.143.115.6, port 56 > switch 10.143.115.12

2. Port-to-room-location mapping —704

The network path to the device port to which you are currently connected is:
   Device 10.143.115.6 | Port 56 >
   Device 10.143.115.12 | Port 14
   Port mapping exists for this port - stored mapping is to room 613
   Enter new room number ONLY if you would like to change room mapping 706
   [_____] Enter new room number 708— ( Submit )  ( Cancel )—710

FIG. 7

AUTOMATIC SWITCH-MAPPING AND CLIENT DEVICE LOCATION DETECTION

CROSS-REFERENCE TO RELATED APPLICATIONS

This application is a continuation of U.S. patent application Ser. No. 13/462,662 filed May 2, 2012, which is incorporated herein by reference.

BACKGROUND OF THE INVENTION (1) Field of the Invention

The invention pertains generally to automatically determining client device location within a hospitality establishment. More specifically, the invention relates to mapping source access-nodes of a computer network at a hospitality establishment to known locations within the hospitality establishment in order to thereafter automatically detect a location of a client device.

(2) Description of the Related Art

Hospitality establishments such as hotels and resorts often provide high speed Internet access (HSIA) in guest rooms. Room detection functionality allows the HSIA system to automatically detect from which guest room a particular user device is accessing the hotel's computer network in order to automatically bill the corresponding room folio for Internet access. In this way, a guest staying in a particular room can connect a user device to a network access port in the particular room and any associated fees for Internet access are directly and automatically charged to the detected guest room.

An example of an HSIA solution employed in the hospitality industry is the One View Internet™ (OVI) system by Guest Tek Interactive Entertainment Ltd. With the OVI system, when a user device is attached to the hotel's local area network (LAN), a dynamic host configuration protocol (DHCP) server on the LAN assigns a dynamic Internet Protocol (IP) address to the device. In order to detect in which room the user device is located, the OVI system receives a packet specifying the user device's assigned IP address and looks up the user device's media access control (MAC) address from an address resolution protocol (ARP) table. The OVI system then queries a core switch utilizing simple network management protocol (SNMP) to determine which port of the core switch is associated with the MAC address of the user device.

According to a predetermined network map that describes how all the ports of the various switches in the hotel's computer network are connected, the OVI system then determines that the detected port of the core switch either leads to a specific guest room (the room detection process is finished at this point), or that the port leads to another switch. In the case that the port is connected to another switch, the OVI system repeats the process by querying the other switch to find out the port of that switch that is associated with the MAC address of the user device. The process continues until a source switch port associated with MAC address is specified in the network map as being connected to a specific guest room. The OVI system thereby follows the MAC address of the client device by traversing switches of the hotel's computer network to find associated source port(s) until the network map indicates that a final source port leads to a specific guest room.

However, a drawback of the above approach is that the process is dependent upon an accurate network map indicating the path from each guest room through the various switches. The original installers of the hotel's computer network must carefully document the switch/port connections as the network is built and manually input this information into a mapping database. Manually creating a network map in this manner is time consuming and error prone. Additionally, if the network layout later changes, such as may occur during an adjustment to the hotel's computer network after installation, the old network map may no longer be valid and automatic room detection may thereafter fail to work properly. In this situation, network support staff must be called in to fix the network map, which again requires time consuming and error prone manual inspection of switch port cable wiring and entry of corresponding information into a new mapping database.

BRIEF SUMMARY OF THE INVENTION

In an exemplary embodiment of the invention an access-node mapping table is dynamically generated during a network map learning phase and thereafter utilized during a client device location detection phase to automatically determine the location of client devices at a hospitality establishment. Accuracy of device location detection is thereby increased while network installation and support times required by network installers and support staff are beneficially reduced.

According to an exemplary configuration of the invention there is disclosed a method including receiving first network traffic transmitted on a computer network of a hospitality establishment from a known location within the hospitality establishment, querying one or more network components of the computer network to determine a source access-node from which the first network traffic originated, and storing a mapping of the source access-node to the known location in a storage device. The method further includes receiving second network traffic transmitted on the computer network by a client device at the hospitality establishment, querying the one or more network components of the computer network to determine that the second network traffic originated from the source access-node, and automatically determining the client device to be at the known location according to the mapping in the storage device.

According to another exemplary configuration of the invention there is disclosed an apparatus including a network interface coupled to a computer network of a hospitality establishment, a storage device, and a controller module having access to the network interface and the storage device. The controller module is configured to receive via the network interface first network traffic transmitted on the computer network from a known location within the hospitality establishment, query via the network interface one or more network components of the computer network to determine a source access-node from which the first network traffic originated, and store a mapping of the source access-node to the known location in the storage device. The controller module is further configured to receive via the network interface second network traffic transmitted on the computer network by a client device at the hospitality establishment, query via the network interface the one or more network components of the computer network to determine that the second network traffic originated from the source access-node, and automatically determine the client device to be at the known location according to the mapping in the storage device.

According to yet another exemplary configuration of the invention there is disclosed an apparatus including means for receiving first network traffic transmitted on a computer network of a hospitality establishment from a known location within the hospitality establishment, means for querying one or more network components of the computer network to determine a source access-node from which the first network traffic originated, means for storing a mapping of the source access-node to the known location, means for receiving second network traffic transmitted on the computer network by a client device at the hospitality establishment, means for querying the one or more network components of the computer network to determine that the second network traffic originated from the source access-node, and means for automatically determining the client device to be at the known location according to the mapping.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof, wherein:

FIG. 3 illustrates an example of updating port-to-switch mappings in the access-node mapping table of FIG. 1 while performing steps of FIG. 2.

FIG. 7 illustrates a UI screen generated by the web server module of FIG. 1 and displayed in a web browser of a network installer's computer at a predetermined uniform resource locator (URL) according to an exemplary embodiment.

DETAILED DESCRIPTION

Figure 1:
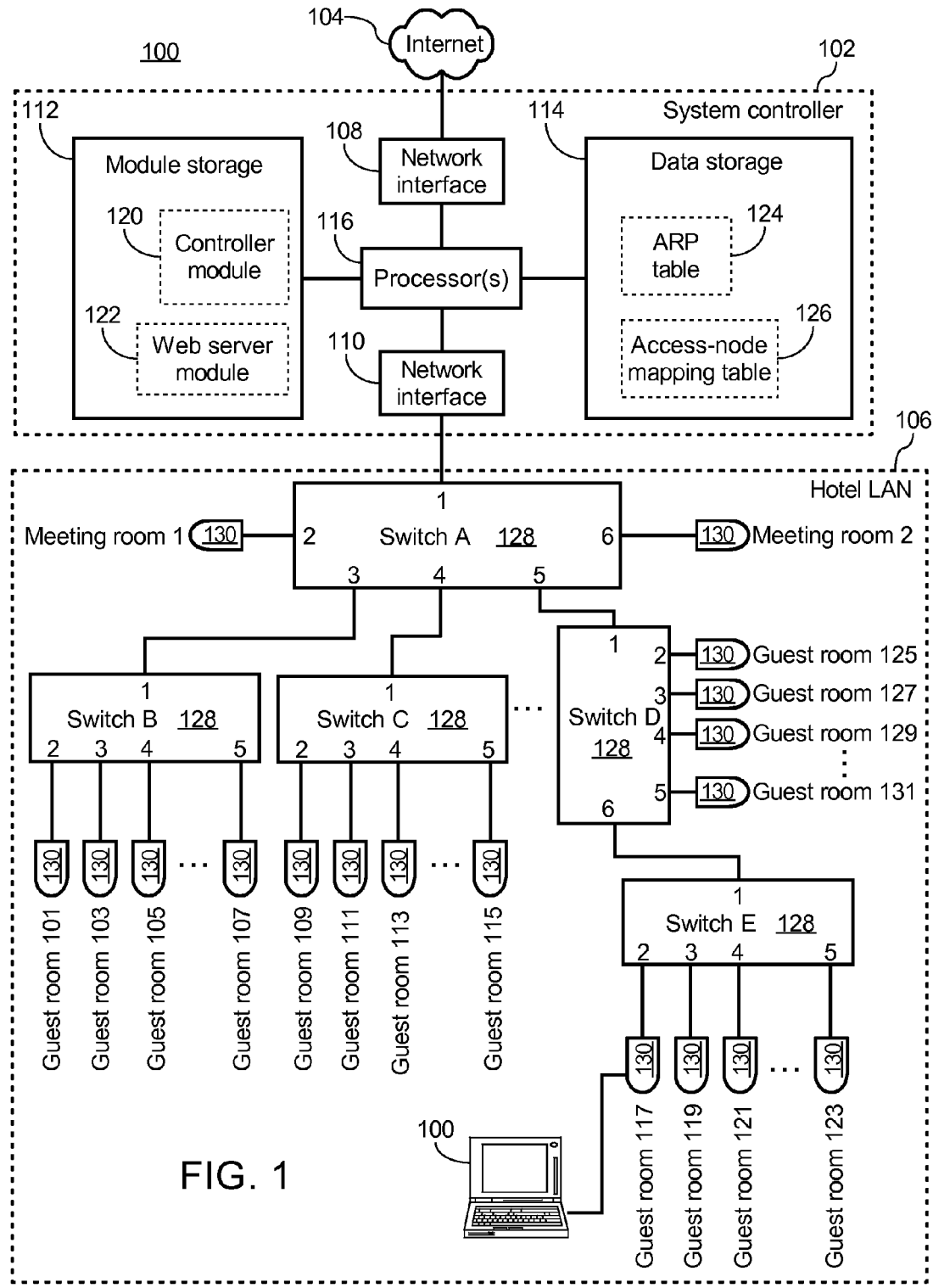
FIG. 1 illustrates a system for automatically determining client device location within a hospitality establishment according to an exemplary embodiment of the invention.

FIG. 1 illustrates a system 100 for automatically determining client device 100 location within a hospitality establishment according to an exemplary embodiment of the invention. In this embodiment, the hospitality establishment is a hotel and the system 100 includes a system controller 102 coupled between the Internet 104 and a computer network of the hospitality establishment illustrated as hotel local area network (LAN) 106 in FIG. 1.

The system controller 102 in this embodiment is a computer server including a first network interface 108 coupled to the Internet 104 and a second network interface 110 coupled to the hotel's LAN 106. The system controller 102 further includes a module storage device 112 and a data storage device 114, and each of the network interfaces 108, 110 and storage devices 112, 114 are coupled to one or more processors 116. In the following description, the plural form of the word "processors" will be utilized as it is common for a CPU of a computer server to have multiple processors (sometimes also referred to as cores); however, it is to be understood that a single processor may also be configured to perform the below-described functionality in other implementations.

The system controller 102 in this embodiment integrates and performs a variety of functions on the hotel LAN 106. To allow the system controller 102 to perform these functions, the module storage device 112 stores a number of software modules including a controller module 120 and a web server module 122 for execution by the processors 116.

The data storage device 114 stores data utilized by the processors 116 when performing the functions of the various modules 120, 122. In this example, the data storage device 114 stores an address resolution protocol (ARP) table 124 and an access-node mapping table 126. The ARP table 124 is well-known in the art and allows the system controller 102 to lookup the MAC address of a device on the hotel LAN 106 according to its IP address. The access-node mapping table 126 stores the mappings between the various source access-nodes 130 and known locations (e.g., meeting and guest rooms) within the hospitality establishment.

As illustrated in FIG. 1, the hotel LAN 106 in this embodiment includes a plurality of interconnected switches 128 that provide the various network access-nodes 130 throughout the available guest and meeting room locations of the hotel. In this embodiment, the access-nodes 130 correspond to ports of switches 128 that are accessible to hotel guests. For example, port 2 of "Switch E" provides an access-node 130 available in "Guest room 117" of the hotel, and a guest staying in that guest room may connect their personal electronic devices to that access-node 130 within the room in order to gain Internet access 104 and/or other network services while staying at the hotel. In this embodiment, a guest accesses an access-node 130 via an Ethernet port mounted on a desk or wall within a particular location (e.g., guest or meeting room) of the hotel; however, it is to be understood that the different access-nodes 130 may be made accessible to guests utilizing any type of wired or wireless technology in other embodiments.

As shown in FIG. 1 and utilized in the following description, the reference numeral "128" generally refers to a switch or switches of the hotel LAN 106, and the reference numeral "130" generally refers to an access-node or access-nodes available within the hotel. To help illustrate certain examples using the exemplary network layout illustrated in FIG. 1, when a specific switch 128 or access-node 130 of FIG. 1 is being referred to, the text based description shown in FIG. 1 such as the switch 128 labeled "Switch A" or the source access-node 130 in "Guest room 117" is further utilized for clarification.

As executed by the processors 116, the controller module 120 performs tasks related to mapping different source access-nodes 130 of the hotel LAN 106 to known locations within the hospitality establishment for storage in the access-node mapping table 126. In this exemplary embodiment, the known locations are specific guest rooms and meetings rooms of the hotel identified by their unique room numbers; however, it is to be understood that any type of location identified by any type of location identifier may be mapped to a particular source access-node 130 in other embodiments.

After the various source access-nodes 130 are each mapped to a known location, the controller module 120 performs tasks related to automatically determining the location of a client device 100 within the hotel according to these mappings.

The web server module 122 allows both guests and staff at the hotel to receive information from and transmit information to the system controller 102 via one or more web pages.

Figure 2:
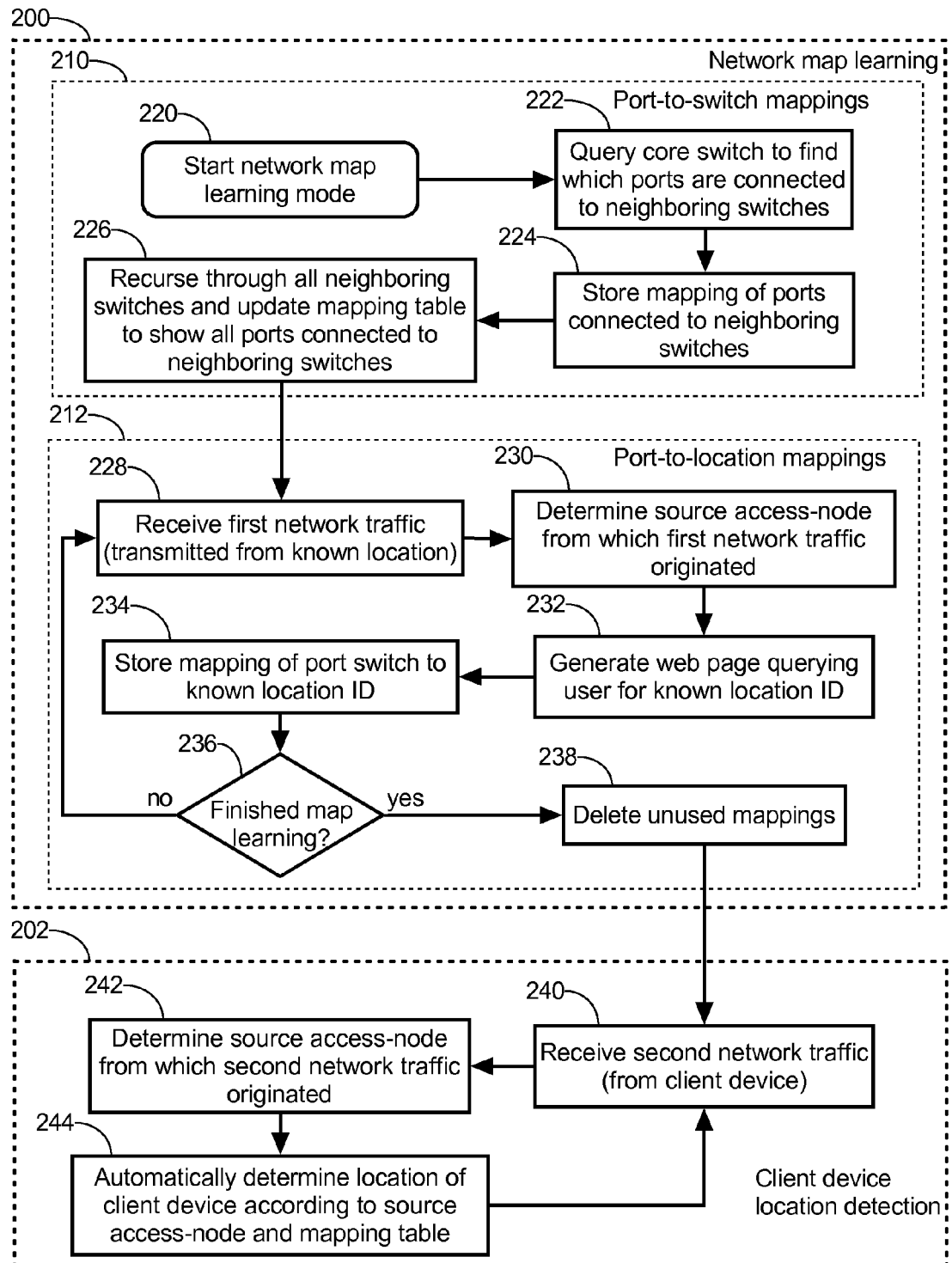
FIG. 2 illustrates a flowchart describing a method of automatically determining the location of a client device within a hospitality establishment according an exemplary embodiment of the invention.

FIG. 2 illustrates a flowchart describing a method of automatically determining the location of a client device 100 within a hospitality establishment according an exemplary embodiment of the invention. The steps of the flowchart of FIG. 2 are not restricted to the exact order shown, and, in other embodiments, shown steps may be omitted or other intermediate steps added. In this embodiment, the processors 116 execute the controller module 120 and/or the web server module 122 in order to cause the system controller 102 to perform the illustrated steps.

The flowchart of FIG. 2 is generally divided into two phases: a first phase 200 when the system controller 102 dynamically maps the hotel LAN 106 in order to store the access-node mapping table 126 in the data storage device 114; and a second phase 202 when the system controller 102 utilizes the stored access-node mapping table 126 to automatically determine the location of client devices 100 within the hotel.

The network learning phase 200 is itself divided into two stages: a port-to-switch mapping stage 210 when the system controller 102 determines and stores a switch-mapping indicating how the various ports of the switches 128 are interconnected between the different switches 128; and a port-to-location mapping stage 212 when the system controller 102 determines and stores mappings of various source access-nodes 130 to known locations as network traffic is received from the known locations.

Briefly described, during the port-to-switch mapping stage 210, the system controller 102 automatically recurses through all the switches 128 of the hotel LAN 106 in order to determine and record how the ports of the switches 128 are interconnected. This stage 210 is performed by the system controller 102 actively querying the various switches 128 over the hotel LAN 106.

During the port-to-location mapping stage 212, the system controller receives first network traffic from a known location and then queries the switches 128 in order to determine the specific source access-node 130 from which the first network traffic was transmitted. The system controller 102 then stores a mapping of the source access-node 130 to the known location in the access-node mapping table 126.

Concerning how the first network traffic is transmitted to the system controller 102 from the known the location, in the first phase 200 of the process of FIG. 2 the client device 100 illustrated in FIG. 1 represents a configuration device carried room to room by an installer (or other user). The client device 100 transmits first network traffic via the source access-node(s) 130 of each known location within the hotel. For example, an installer may plug in a client device 100 (e.g., tablet computer) to the one or more Ethernet ports available in each guest room and meeting room within the hotel in order to transmit first network traffic to the system controller 102. The client device 100 may be configured to include the identifier of the known location (e.g., the guest room number or meeting room number) in the transmitted first network traffic to thereby inform the system controller 102 of the known location from which it was transmitted. The system controller 102 thereby dynamically builds an access-node mapping table 126 associating the detected source access-nodes 130 with the corresponding known locations.

In the second phase 202, the system controller 102 utilizes the stored access-node mapping table 126 to automatically determine the location of subsequent client devices 100 within the hotel. In the second phase 202 the client device 100 illustrated in FIG. 1 corresponds to any portable electronic device such as a tablet computer or mobile phone brought to the hotel by a guest. The client device 100 transmits second network traffic to the system controller 102, and the second network traffic indicates the IP/MAC address of the client device 100 but does not indicate any known location in the hotel from which it was transmitted. The system controller 102 automatically determines the location of the client device 100 by determining the source access-node 130 associated with the MAC address of the client device 100 and looking up the known location associated with the determined source access-node 130 in the access-node mapping table 126.

Further details of how the system controller 102 dynamically creates the access-node mapping table 126 during the network learning phase 200 and performs automatic client device location detection in the second phase 202 are provided with respect to the below-described individual steps of the flowchart of FIG. 2.

The network learning phase 200 in this embodiment begins at step 220 when the system 100 is put into a network map learning mode. This may be upon initial installation of the hotel's LAN 106, or may be after the network layout has changed such as after a further expansion of or adjustment to the hotel's LAN 106. A web interface offered by the web server module 122 may allow an installer, hotel staff, or other user to activate the network map learning mode. For example, the controller module 120 may activate network map learning mode after receiving a command from an authorized client device 100 via hotel LAN 106.

At step 222, the controller module 120 queries an initial switch 128 of the hotel LAN 106 such as the core switch (e.g., "Switch A" in FIG. 1) by utilizing simple network management protocol (SNMP) to issue a well-known neighboring switches command. As is understood in the art, the neighboring switches command causes the core switch 128 to report the IP addresses of all neighboring switches 128 of which the core switch 128 is aware.

From the IP addresses of the neighboring switches, the controller module 120 finds the ports of the core switch 128 that are connected to neighboring switches by:

1. Looking up a neighboring switch's IP address in the ARP table 124 to determine the corresponding MAC address, 2. Converting the MAC address to a format utilized by the core switch (e.g., converting from hexadecimal format to decimal format if required by the core switch), and 3. Querying the core switch using SNMP to determine the port of the core switch associated with the MAC address.

If there a plurality of different IP addresses corresponding to a plurality of neighboring switches 128, the above processes is repeated to find the port associated with each neighboring switch 128.

At step 224, the controller module 120 updates the access-node mapping table 126 for the core switch 128 (e.g., "Switch A" in FIG. 1) according to the results of step 222. For example, with reference to FIG. 1, the controller module 120 updates the access-node mapping table 126 to record that port 3 of "Switch A" leads to "Switch B", and port 4 of "Switch A" leads to "Switch C". As port 5 of "Switch D" leads to both "Switch D" and "Switch E", the controller module 120 must further query these sub-neighboring switches to determine their connection order (see description of step 226). In some embodiments, the unique IP address or MAC address of each of the switches 128 may be utilized as a switch identifier for storage in the mapping table 126 rather than the exemplary names (A, B, C, D) utilized in this example.

At step 226, the controller module 120 repeats a similar process as described above for steps 222 and 224 as it recurses through the various neighboring switches 128 found at step 222 (and their sub-neighboring switches 128, etc.). In this way, the paths between all the switches 128 on the hotel LAN 106 are automatically mapped by the system controller 102 and stored in the access-node mapping table 126.

FIG. 3 illustrates an example of updating port-to-switch mappings in the access-node mapping table 126 during steps 224 and 226. The dotted box shows how an undefined switch port (e.g., port 6 of "Switch D") is updated by the controller module 120 storing a mapping of this port to its determined destination switch (e.g., "Switch E"). The right hand side of FIG. 3 represents the state of the access-node mapping table 126 at the end of step 226. At this point, the port-to-switch mapping stage 210 is complete and the interconnections of all switches 128 on the hotel LAN 106 have been recorded in the access-node mapping table 126.

Continuing the description of FIG. 2, at step 228, the controller module 120 receives first network traffic such as transmitted by a client device 100 operating as a configuration device carried by an installer from room to room in the hotel. In this embodiment, first network traffic refers to network traffic that is transmitted from a known location in the hotel. For example, when the first network traffic is transmitted from the client device 100 via an access-node 130 in "Guest room 117", the known location from which the first network traffic was transmitted is "Guest room 117".

The first network traffic may be a datagram such as one or more IP packets containing a hypertext transfer protocol (HTTP) request for a particular web page provided by the web server module 122. The particular web page may be a custom web page utilized by installers or support staff at the hotel. The first network traffic includes a source IP address being the IP address assigned to the client device 100 for use on the hotel LAN 106.

At step 230, the controller module 120 queries one or more of the switches 128 of the hotel LAN 106 to determine the source access-node 130 from which the first network traffic originated. In this embodiment, the source access-node 130 is a specific port of a specific switch 128 from which the first network traffic was originally transmitted.

Continuing the above example of the first network traffic being transmitted by the client device 100 in "Guest room 117", the source access node 130 is determined at this step to be port 2 of "Switch E". Further details of how the controller module 120 determines the source access-node 130 of the first network traffic at this step according to an exemplary embodiment are provided below with reference to FIG. 6.

At step 232, the controller module 120 causes the web server module 122 to generate a web page querying a user of the client device 100 to input the known location (e.g., "Guest room 117") from which the first network traffic was transmitted. In a preferred embodiment, the first network traffic received at step 228 is an HTTP request for a predetermined web page provided by the web server module 122, and the web server module 122 replies to the HTTP request with an HTTP response including the web page dynamically generated at this step.

Figure 4:
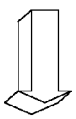
FIG. 4 illustrates a UI screen querying a user for the known location within the hospitality establishment from which the first network traffic was transmitted according to an exemplary embodiment.

FIG. 4 illustrates a UI screen 400 querying a user for the known location within the hotel from which the first network traffic was transmitted according to an exemplary embodiment. In this embodiment, the UI screen 400 corresponds to the web page generated by the web server module 122 at step 232 of FIG. 2 and displayed by the client device 100.

UI screen 400 includes a first section 410 informing the user of the network path to the source access node 130 (e.g., "Switch E—port 2" in this example) as detected by the system controller 102. The path traverses through the various switches 128 and access-nodes 130 and this information is displayed to the user via UI screen 400. By the first section 410 informing the user of the path (e.g., switch/port connections as detected at steps 222, 226, and 230), the user is optionally enabled to cross-reference this automatically detected path with an intended wiring diagram, which may be beneficial to assist the user in identifying misconnected switch ports.

UI screen 400 also includes a second section 412 informing the user of any existing mappings from the source access-node 130 determined at step 230 to one or more particular location(s) at the hotel. For example, if the access-node mapping table 126 already associates one or more locations of the hotel with the determined source access-node, the already associated location(s) is/are displayed in the second section 412 to help prevent errors.

In this example, there are no existing mappings from the detected "Switch E—port 2" source access-node 130 (e.g., indicated by <none> displayed in section 412 of FIG. 4). For example, there may be no existing mappings when the hotel LAN 106 is newly installed. UI screen 400 may also be beneficially utilized when adjustments are made to the hotel LAN 106 such as adding or removing switches 128, or adjusting switch 128 interconnections. In such situations, the access-node mapping table 126 may already store an existing mapping from the detected source access-node 130 to a particular location, which will be displayed in the second section 412.

A third section 414 of UI screen 400 allows the user to input the known location from which the first network traffic was transmitted. For example, the installer utilizes the scroll list provided in this section 414 to select the known location from which the first network traffic was transmitted. In the context of a hotel LAN 106 installation, the scroll list provided in this section 414 allows the installer select the room name/number as is usually posted on the door of typical hotel room or meeting room, for example, "Guest room 117". In some embodiments, the web page may include an input field allowing a user to type in the current location's name, number, or other unique location identifier (ID).

As shown, UI screen 400 requests confirmation from the user of the configuration device (e.g., client device 100) via the hotel LAN 106 to overwrite the existing mapping of the source access-node 130 ("Switch E—port 2") to a new location ("Room 117"). By pressing the submit button 416, the user confirms that the old mapping (e.g., <none> in this example) is to be overwritten with the new known location selected in section 414 ("Room 117" in this example).

Continuing the description of step 232 of FIG. 2, when the user presses the submit button 416 on the UI screen 400, the known location of the hotel as specified in section 414 of UI screen 400 from which the first network traffic was transmitted is received by the web server module 122. This known location information is passed by the web server module 122 to the controller module and control proceeds to step 234.

At step 234, the system controller 102 updates the access-node mapping table 126 according to the known location entered by the user in section 414 of UI screen 400. Updating the access-node mapping table 126 in this embodiment involves storing in the data storage device 114 a mapping of the source access-node 130 determined at step 230 to the known location received from the user at step 232. As previously mentioned, this step may involve overwriting an existing mapping already stored in the access-node mapping table 126 for this source access-node 130.

Figure 5:
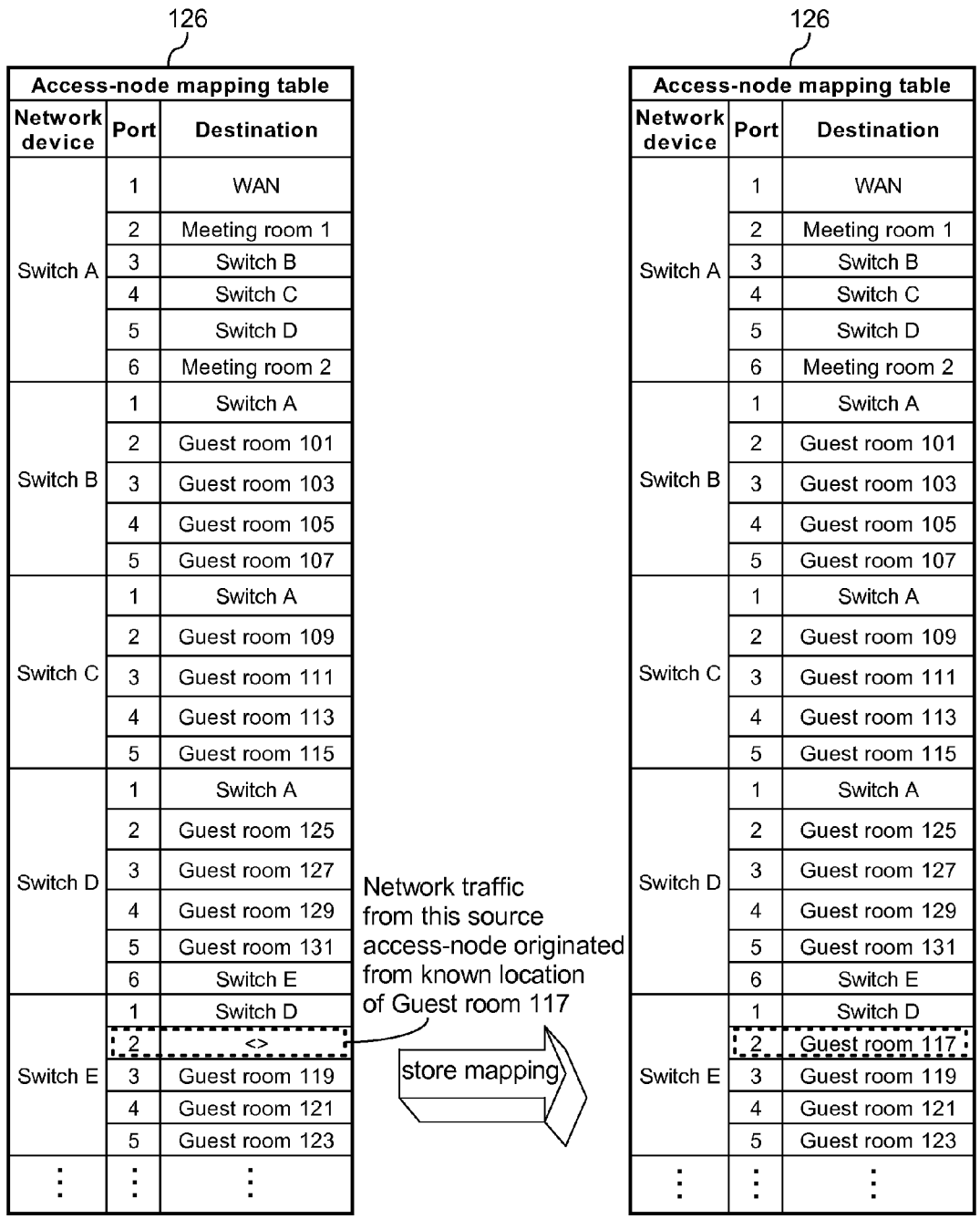
FIG. 5 illustrates an example of updating port-to-location mappings in the access-node mapping table of FIG. 1 while performing steps of FIG. 2.

FIG. 5 illustrates an example of updating port-to-location mappings in the access-node mapping table 126 during step 234. The dotted box shows how the location mapping associated with the source access-node 130 from which the first network traffic originated (e.g., determined at step 230 to be port 2 of "Switch E") is updated by the controller module 120. Because the user specified the known location from which the first network traffic was transmitted as "Guest room 117" (e.g., utilizing section 417 of UI screen 400), the controller module 120 stores a mapping from the source access-node 130 of "Switch E—port 2" to the known location of "Guest room 117".

Continuing the description of the flowchart of FIG. 2, at step 236, the controller module 120 determines whether the network map learning is finished. In some embodiments, this may be done by the installer sending a command to the controller module 120 from the client device 100 that disables the network map learning mode. In other embodiments, the controller module 120 may compare the contents of the access-node mapping table 126 with a list of connected switch 128 ports. When all connected switch 128 ports of the hotel LAN 106 are found to be mapped to a known location or another switch, then the controller module 120 may automatically determine the network map learning to be finished. In yet other embodiments, the controller module 120 may compare the contents of the access-node mapping table 126 with a list of all possible hotel locations. When there is at least one source access-node in the access-node mapping table 126 mapped to each of the possible hotel locations, the controller module 120 may automatically determine the network map learning to be finished. When network map learning is finished, control proceeds to step 238; otherwise, control returns to step 228 to continue mapping a next location.

When control returns to step 228, the installer may connect the client device 100 (e.g., a configuration device carried by the installer) to a next unmapped source access-node 130 in the hotel. The next unmapped source access-node may be either at the same location such as when a single guest or meeting room has multiple available access-nodes 130, or may be at a new location such as when the installer moves to a next guest room at the hotel. In some embodiments, the web server module 122 may inform the installer of which known locations within the hotel and/or which source access-nodes remain unmapped.

At step 238, the controller module 120 deletes unused mappings from the access-node mapping table 126. This step may involve generating a UI screen by the web server module 122 to inform the user of all the existing mapping(s) of different access-nodes 130 to any of the known locations mapped during the network map learning mode phase 200 of FIG. 2. For example, when a hotel LAN 106 is adjusted after installation, there may already be an access-node mapping table 126 having existing mappings to a known location such as "Room 117". However, during the network map learning phase 200, the controller module 120 stores new mappings of one or more different source access node(s) (e.g., "Switch E—port 2" in this example) to the known location. This may indicate that any existing mappings to the known location ("Room 117") may no longer be valid. The web server module 122 thereby informs the user of the existing mappings of the different source access-nodes 130 to the known location and requests confirmation to delete them from the mapping table 126. When confirmation is received, these unused existing mappings are deleted.

Referring again to FIG. 5, the right hand side of FIG. 5 represents the state of the access-node mapping table 126 at the end of step 238. At this point, the port-to-location mapping stage 210 is complete and the network map learning phase 200 is also complete. Both the interconnections of all switches 128 on the hotel LAN 106 and the mappings from individual source access-nodes 130 to known locations are now stored in the access-node mapping table 126. The process of FIG. 2 then enters the client device location detection phase 202.

At step 240, the controller module 120 receives second network traffic transmitted on the hotel LAN 106 such as transmitted by a client device 100 brought to the hotel by a guest of the hotel. In this embodiment, second network traffic refers to network traffic that is transmitted by a client device 100 from an unknown location within the hotel. Similar to the first network traffic received at step 228, the second network traffic received at step 240 may be a datagram such as one or more IP packets containing a hypertext transfer protocol (HTTP) request for a particular web page provided by the web server module 122. For example, the particular web page may be a login portal page or other welcome web page shown to new client devices 100 upon connection to the hotel LAN 106 before high speed Internet access (HSIA) to the Internet 104 is granted. Alternatively, the second network traffic may an HTTP request by a hotel guest for a web site on the Internet 104.

At step 242, the controller module 120 queries one or more of the switches 128 of the hotel LAN 106 to determine the source access-node 130 from which the second network traffic originated. In this embodiment, the source access-node 130 is the specific port of the specific switch 128 via which the second network traffic was originally transmitted. Continuing the above example of the first network traffic being transmitted by the client device 100 in "Guest room 117", the source access node 130 is determined at this step to be port 2 of "Switch E". The action of the controller module 120 at this step may be similar to that performed by the controller module 120 at step 230; an exemplary process which may be utilized by the controller module 120 at these steps to determine the source access-node 130 is provided in FIG. 6.

Figure 6:
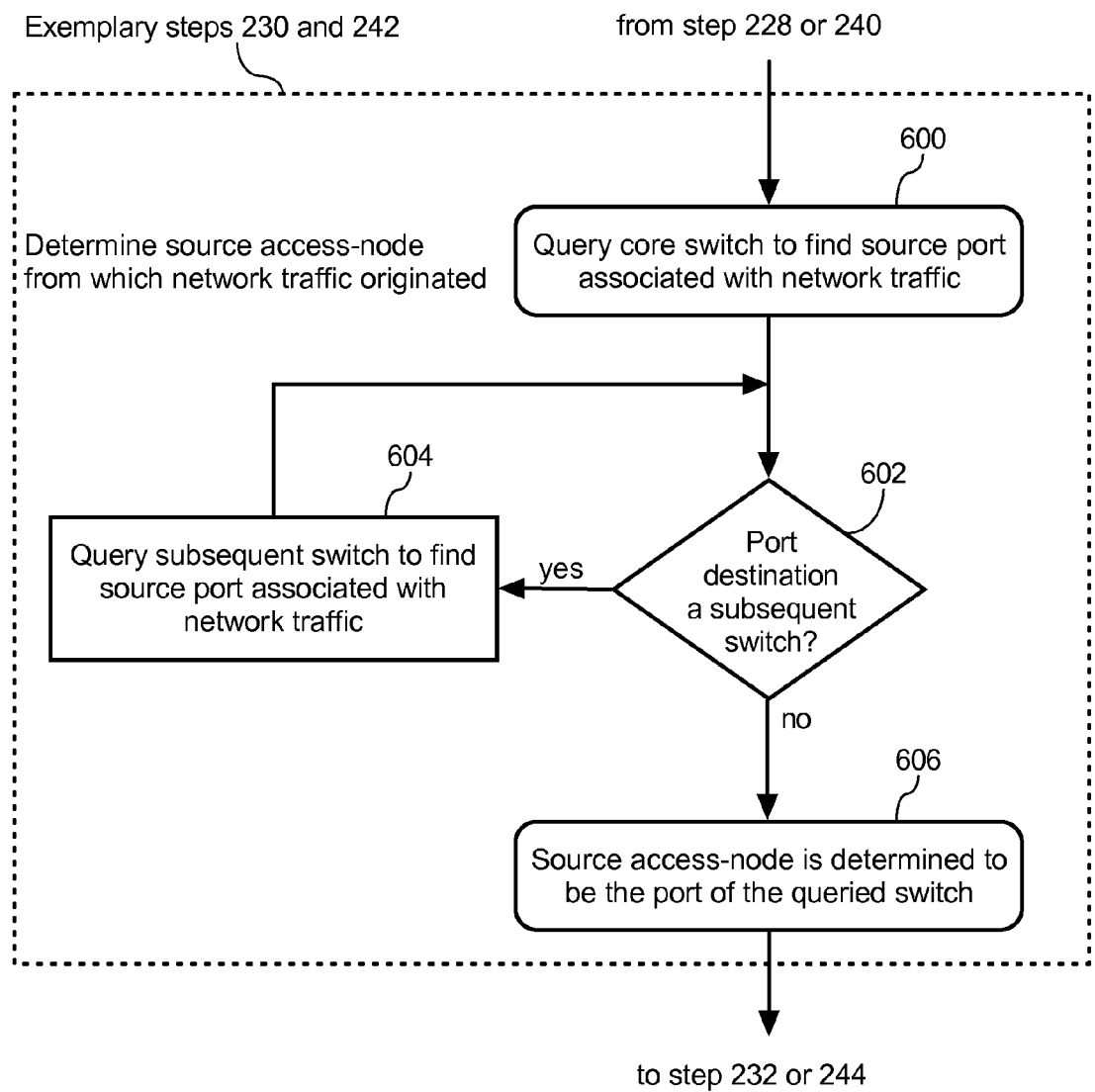
FIG. 6 illustrates a flowchart describing how the system controller of FIG. 1 determines the source access-node from which network traffic originated according to an exemplary embodiment.

FIG. 6 illustrates a flowchart describing how the system controller 102 determines the source access-node from which network traffic originated according to an exemplary embodiment. The steps of the flowchart of FIG. 6 are not restricted to the exact order shown, and, in other embodiments, shown steps may be omitted or other intermediate steps added. In this embodiment the processors 116 execute the controller module 120 in order to cause the system controller 102 to perform the illustrated steps.

At step 600, the controller module 120 queries an initial switch 128 such as the core switch (e.g., "Switch A" in FIG. 1) utilizing SNMP via the hotel LAN 106 to find a port of the switch that is associated with a source address associated with the received network traffic. The source address associated with the received network traffic may be included in the received network traffic (e.g., IP address or MAC address of the source client device 100). Alternatively, the controller module 120 may receive the network traffic specifying the client device's 100 assigned IP address and then look up the client device's 100 media access control (MAC) address from the address resolution protocol (ARP) table 124. As mentioned with respect to step 222, the controller module 120 may further convert the MAC address to a format utilized by the queried switch 128 such as by converting from hexadecimal format to decimal format if required by the switch 128.

At step 602, when the determined port (associated with the received network traffic) is mapped in the access-node mapping table 126 to a destination being a subsequent switch 128, control proceeds to step 604; otherwise, control proceeds to step 606. The controller module 120 searches the access-node mapping table 126 at this step to find the destination of the determined port.

At step 604, the controller module 120 queries the subsequent switch 128 determined at step 602 utilizing SNMP via the hotel LAN 106 to find a port of the subsequent switch 128 that has received network traffic from the source address associated with the network traffic. As in step 606, the source address associated with the network traffic may be converted by the controller module 120 into a format required by the subsequent switch 128.

At step 606, the controller module 120 defines the source access-node 130 from which the network traffic originated to be the port of the switch 128 determined at either step 600 when step 604 was not reached, or at the most recent iteration of step 604 when step 604 was reached at least one time.

The controller module 120 may utilize the process of FIG. 6 at step 230 of FIG. 2 to determine the source access-node from which the first network traffic originated. Likewise, the controller module 120 may utilize the same process at step 242 of FIG. 2 to determine the source access-node from which the second network traffic originated. In this way, the controller module 120 follows the MAC address of the client device 100 by traversing switches 128 of the hotel LAN 106 to find associated source port(s) until the network map indicates the final source port leading to a specific location (e.g., guest or meeting room) of the hotel. This final source port is the source access-node 130 from which the network traffic originated.

Returning to FIG. 2, at step 244, the controller module 120 looks up in the access-node mapping table 126 the known location associated with the source access-node 130 of the second network traffic (e.g., determined at step 242 utilizing the process of FIG. 6). For example, when the client device 100 illustrated in FIG. 1 transmits second network traffic to the system controller 102, the source access-node 130 is found to be "Switch E—port 2", and this source access-node 130 is found to be mapped to "Guest room 117" in the access-node mapping table 126.

The system controller 102 in this embodiment makes use of the access-node mapping table 126 dynamically generated during the network map learning phase 200 to automatically determine the location of client devices 100 at the hotel during the client device location detection phase 202. Because the access-node mapping table 126 is dynamically generated by the system 100, accuracy is increased while network installation and support times required by installer staff are beneficially reduced. Installers are not required to manually inspect switch cable wiring and populate this information into a database, but may instead hook up the switches in any manner and then simply carry a configuration device (e.g., client device 100) room to room. The system 100 automatically generates the mapping table 126 according to first network traffic generated by the configuration device. Likewise, if the switch cables are adjusted after installation, the system 100 may dynamically correct the mappings stored in the access-node mapping table 126 in a similar manner.

Although the invention has been described in connection with preferred embodiments, it should be understood that various modifications, additions and alterations may be made to the invention by one skilled in the art without departing from the spirit and scope of the invention as defined in the appended claims.

For example, in another embodiment, step 232 may be removed when the first network traffic received at step 228 already specifies the known location. This embodiment may be useful when running a predetermined application on the client device 100 such as a hotel configuration application. Installers may simply enter the known location into the application and then press a "configure room" button on the configuration application. This action causes the client device 100 to send first network traffic already specifying the known location to the system controller 102.

The client device 100 may guide an installer to "test" each source access-node 130 in the hotel, and as part of the testing procedure the access-node mapping table 126 is automatically updated by the controller module 120. Other aspects of network testing may be performed at the same time such as testing connectivity of each Ethernet port installed in each room, for example.

It is not required that a human installer manually type in a room number or other identifier of the known location from which the first network is received. In some embodiments the client device 100 and/or the controller module 120 already know the known location currently undergoing testing. For example, if each hotel room is known by the controller module 120 to include four Ethernet ports, the controller module 120 may keep track of the configuration state of each room and guide the installer to rooms that don't yet have at least four unique source access-nodes 130 currently mapped. The order of testing source access-nodes 130 may be predetermined so that both the controller module 120 and the client device 100 carried by the installer keep track of the current location of the client device 100 in order to determine the known location from which the first network traffic was transmitted.

In other embodiments, instead of installers carrying client devices 100 room to room during the network map learning phase 200, the system 100 may support this phase being performed utilizing client devices 100 brought to the hotel by guests. In this way, guests of the hotel (rather than installers) enter their known location on a web page at step 232. For example, the system 100 may query guests at the hotel to enter their room number at this stage.

In an exemplary embodiment, when a change to the network 106 layout is made after installation, hotel staff may put the system 100 into a "learning mode" to cause the process of FIG. 2 to begin at step 220. When guest's client devices 100 are thereafter directed to the hotel's login portal (e.g., provided by web server module 122), rather than the controller module 120 automatically detecting the guests' rooms, guests are required to enter their room numbers as part of the login process (i.e., step 232 of FIG. 2). The guests may also be required to enter personal information, which is authenticated utilizing a property management system (PMS) of the hotel in order to ensure the guest is an authorized user of the hotel registered for that room and is not entering a hotel room number of another guest's room. The remaining steps of FIG. 2 may proceed similar to as previously described. In this way, the guests of the hotel help the system 100 automatically generate an updated access-node mapping table 126. Once the network map learning mode is determined to be finished at step 236, automatic device location detection can be activated again by proceeding to step 240. Thereafter, the controller module 120 again automatically detects the location of the client devices 100 without requiring the users to enter this information at the login portal. This embodiment may be advantageously employed to eliminate sending an installer or other staff into each room after a change to the layout of the hotel LAN 106.

In an exemplary embodiment, the invention may be implemented as a network tool running as a servlet available on a computer server 102 at a hotel. In addition to generating the access-node mapping table 126, the tool's purpose is also to help network installers working on the hotel network to identify problems with how network components 128 (e.g., Ethernet or DSL switches) are interconnected, and to allow the installers to see the path taken through the network to a source access node 130 (e.g., a particular switch 128 port) where their test computer 100 is currently connected.

In this embodiment, the tool is accessed via a predetermined uniform resource locator (URL) such as http://server/network-mapping-tool while the installer's computer 100 is connected to a port 130 at the hotel network 106. The tool also allows the installer to insert the switch/room mapping into the access-node mapping table 126. Although FIG. 1 illustrates the mapping table 126 to be stored locally within the system controller 102, in other embodiments mapping table 126 is located at a central database accessed via the Internet 104.

In order for the tool to be able to completely auto-discover the network layout in this embodiment, it may rely solely on Link Layer Discovery Protocol (LLDP) being active on all the network components, such as Ethernet or DSL switches 128. If for some reason LLDP is not enabled on the network components 128, they will not be visible in the tool and the mapping between switches 128 will not be added to the access-node mapping table 126 without a manual input outside of the tool.

FIG. 7 illustrates an output UI screen 700 generated by the web server module 122 and displayed by the tool at the predetermined URL in this embodiment. The top portion 702 of the screen labeled "Port-to-switch mappings" is for presenting any potential problems with the network components 128 themselves. For example, portion 702 shows any switches 128 that are entered in the access-node mapping table 126 but were not discovered during the automatic network scan at step 210 of FIG. 2. These non-existent devices may signal either LLDP not being active or a cabling issue/problem. By default the tool suggests leaving the non-existent switches in the access-node mapping table 126 to be safe; however, generally installers will check the checkbox in order to delete the non-existent switches from the access-node mapping table.

The top portion 702 of the screen 700 also presents the installer with any new switches 128 that were discovered on the network at step 210 of FIG. 2 but are not entered in the access-node mapping table 126. As shown, by default the tool suggest adding these new switches 128 to the access-node mapping table 126; however, an installer may uncheck the checkbox in order to prevent this action if it is not required in a particular installation.

The top portion 702 of the UI screen 700 further presents any stored mappings between interconnected switches 128 in the access-node mapping table 126 that were not discovered during step 210 of FIG. 2. The network installer confirms the deletion of these non-existent paths if desired. Likewise, new mappings between switches 128 discovered during step 210 of FIG. 2 by default are suggested by the tool to be added to the access-node mapping table 126.

The bottom portion 704 of the screen 700 labeled "Port-to-room-location mapping" shows the network path from the core switch 128 (e.g., "Switch A" in FIG. 1) to the last detectable port (e.g., source access node 130) on a switch 128 to which the installers computer 100 is connected. If a mapping to a known room location already exists for this source access node 130 in the access-node mapping table 126, the room number is displayed, for example, mapped guest room 613 in the example shown in FIG. 7. The user is provided the opportunity to enter a new room number in input field 706 to overwrite the mapping stored in the access-node mapping table for this switch port.

When the user clicks the submit button 708, any updated mapping provided at input field 708 and the other additions and deletions of switches and paths specified in the top portion 702 are entered by the controller module 120 in the access-node mapping table 126. If the user determines that a particular mapping item should be added or deleted, s/he must ensure that the checkbox next to this item in the output is checked. Any potential mappings existing in the access-node mapping table 126 that have not been confirmed during the network scan will be presented with checkboxes unchecked. If the user is certain that this mapping is redundant or unnecessary, s/he should check the checkbox before clicking the submit button 706. This item will then be deleted. In the example of FIG. 7, one switch 128 was not discovered, but it exists in the mapping table 126. Upon clicking the submit button 708, mappings will be deleted or added depending on the user's choices.

If no changes are found during the network scan done at step 210 of FIG. 2, only the bottom portion 704 of screen 700 will be visible, i.e., the installer will be shown the path from the core switch 128 to the last switch/port on the network and allowed to enter the known location (e.g., a room name/number) for transmission to the controller module 120 at step 232. If no room name has been found in the access-node mapping table 126, the bottom portion 704 of screen 700 will feature the path through the network taken and a text box where the user can enter the room name.

Additionally, if no mapping exists in the database to indicate the path or identifier of the core switch 128, the user will be presented with a screen where s/he can manually input the IP address of the core switch 128 and click a button to proceed. Clicking the button will initiate a network scan at step 222 by querying the user-specified core switch.

Although the preceding examples have focused on rooms in a hotel, the invention also applicable to other hospitality establishments having other types of locations therewithin. For example, in another embodiment, the hospitality establishment is a passenger plane, the known locations are the various passenger and staff seats on the plane, and the source access-nodes are Ethernet ports available at each of these locations such as near the seats on the plane. In another embodiment, the hospitality establishment is a cruise ship, the known locations are guest cabins within the cruise ship, and the source access-nodes are the Ethernet ports available within each cabin.

Although the preceding examples have focused on network paths formed along switches 128 and their ports, the invention is also applicable to other types of network devices such as routers, DSL equipment, wireless access points (APs), gateways, hubs, etc. For example, in another embodiment, the switches 128 are replaced or augmented with one or more network components being wireless APs. The source access-nodes 130 in this embodiment are defined as specific AP and service set identifier (SSID). For example, the hotel may have one or more APs and SSIDs available therein and these are mapped to known locations within the hotel during the network map learning phase 200.

Rather than utilizing SNMP to query the network components (e.g., switches 128 of FIG. 1), other types of remote configuration protocols may be utilized such as a SSH or telnet command line interfaces (CLI). This may be beneficial in other embodiments where different types of network components are utilized and some do not support SNMP queries.

In an exemplary embodiment, an apparatus for automatic client device location detection includes a controller module configured to receive first network traffic transmitted on a computer network of a hospitality establishment from a known location within the hospitality establishment. The controller module is further configured to query one or more network components of the computer network to determine a source access-node from which the first network traffic originated, and store a mapping of the source access-node to the known location in the storage device. The controller module is further configured to receive second network traffic transmitted on the computer network by a client device at the hospitality establishment, query the one or more network components of the computer network to determine that the second network traffic originated from the source access-node, and automatically determine the client device to be at the known location according to the mapping in the storage device.

Although the invention has been described as being utilized at a hotel for illustration purposes, the present invention is equally applicable to any hospitality related location or service wishing to automatically detect a location of a client device 100 therewithin including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as when it is required to automatically detect the location of a client device in a home or corporate application.

In some embodiments such as illustrated in FIG. 1, the controller module 120 and web server module 122 are integrated together on a single server so passing information between them may employ any suitable application protocol interface (API). In other configurations these modules 120, 122 are implemented on separate servers and passing information between them involves sending data across one or more networks such as the hotel LAN 106 and/or the Internet 104.

The modules 120, 122 may include software executed by one or more processors 116 operating pursuant to instructions stored on a tangible computer-readable medium such as module storage device 112 to perform the above-described functions of any or all aspects of the system controller 102. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. The processors 116 may be included in a general-purpose or specific-purpose computer that becomes the system controller 102 as a result of executing the instructions.

In other embodiments, rather than being software modules executed by one or more processors 116, the modules 120, 122 may be implemented as hardware modules configured to perform the above-described functions.

Functions of single modules may be separated into multiple units, or the functions of multiple modules may be combined into a single unit.

Unless otherwise specified, features described may be implemented in hardware or software according to different design requirements. In addition to a dedicated physical computing device, the word "server" may also mean a service daemon on a single computer, virtual computer, or shared physical computer or computers, for example. Additionally, all combinations and permutations of the above described features and embodiments may be utilized in conjunction with the invention.

What is claimed is:

1. A method comprising:
   querying, by a computer server via a computer network, a first switch of the computer network to determine which ports of the first switch are connected to other switches;
   recursively querying, by the computer server, each of the other switches via the computer network to determine which ports of the other switches are connected to further switches;
   storing a corresponding switch-mapping in a storage device, the switch-mapping indicating how the ports of the switches are interconnected;
   receiving, by the computer server, first network traffic transmitted on the computer network by a first client device, wherein the first network traffic includes an indication of a known location within an establishment from where first network traffic was transmitted;
   querying one or more of the switches of the computer network according to the switch-mapping in order to follow an address of the first client device included in the first network traffic and thereby determine a source access-node of the computer network from which the first network traffic originated, wherein the source access-node is a port of a particular switch from which the first network traffic originated that is not connected to any other switch;
   storing a mapping of the source access-node to the known location in the storage device;
   receiving, by the computer server, second network traffic transmitted on the computer network, wherein the second network traffic is transmitted by a second client device and does not include any indication of the known location;
   querying the one or more of the switches of the computer network in order to follow an address of the second client device included in the second network traffic according to the switch-mapping and thereby determine that the second network traffic also originated from the source access-node; and
   automatically determining the second client device to be at the known location within the establishment according to the mapping in the storage device; wherein the computer server does not receive any indication of the known location from the second client device.

2. The method of claim 1, wherein querying the one or more of the switches of the computer network to determine the source access-node from which the first network traffic originated comprises the following steps:
   (a) querying the first switch via the computer network to find a port of the first switch that has received network traffic from the address of the first client device;
   (b) repeating step (a) when the port of the first switch found at step (a) is connected to a subsequent switch according to the switch-mapping, wherein upon repeating step (a) the first switch is redefined to be the subsequent switch; and
   (c) determining the source access-node from which the first network traffic originated to be the port of the first switch found at step (a) when the port of the first switch found at step (a) is not connected to a subsequent switch according to the switch-mapping.

3. The method of claim 1, further comprising requiring a user of the first client device to input into the first client device the location identifier of the known location from which the first network traffic was transmitted for inclusion in the first network traffic.

4. The method of claim 1, further comprising:
requesting confirmation from the first client device via the computer network to overwrite in the storage device an existing mapping of the source access-node to a location different than the known location; and
overwriting the existing mapping when storing the mapping of the source access-node to the known location in the storage device in response to receiving confirmation from the first client device.

5. The method of claim 1, further comprising:
requesting confirmation from the first device via the computer network to delete in the storage device an existing mapping of a different access-node to the known location; and
deleting the existing mapping in response to receiving confirmation from the first client device.

6. The method of claim 1, wherein the establishment is a lodging establishment and the known location is a specific guest room within the lodging establishment.

7. The method of claim 1, further comprising:
storing the switch-mapping in the storage device and receiving the first network traffic during a network map learning phase; and
receiving the second network traffic during a client device location detection phase that occurs after the network map learning phase is completed.

8. The method of claim 1, further comprising:
providing, by the computer server, a login portal to which new client devices at the establishment are directed before being granted access to a network service; and
granting access to the network service for the second client device without requiring a user of the second client device to enter any location identifier of the known location at the login portal.

9. The method of claim 1, further comprising billing a folio associated with the known location to thereby charge for a network service provided to the second client device after automatically determining the second client device to be at the known location.

10. A non-transitory computer-readable medium comprising computer executable instructions that when executed by a computer cause the computer to perform the method of claim 1.

11. An apparatus comprising:
a network interface coupled to a computer network of an establishment;
a storage device; and
one or more processors coupled to the network interface and the storage device;
wherein the one or more processors are operable to:
query via the network interface a first switch of the computer network to determine which ports of the first switch are connected to other switches;
recursively query each of the other switches via the network interface to determine which ports of the other switches are connected to further switches;
store a corresponding switch-mapping in the storage device, the switch-mapping indicating how the ports of the switches are interconnected;
receive via the network interface first network traffic transmitted on the computer network by a first client device, wherein the first network traffic includes an indication of a known location within the establishment from where first network traffic was transmitted;
query via the network interface one or more of the switches of the computer network according to the switch-mapping in order to follow an address of the first client device included in the first network traffic and thereby determine a source access-node of the computer network from which the first network traffic originated, wherein the source access-node is a port of a particular switch from which the first network traffic originated that is not connected to any other switch;
store a mapping of the source access-node to the known location in the storage device;
receive via the network interface second network traffic transmitted on the computer network, wherein the second network traffic is transmitted by a second client device and does not include any indication of the known location;
query via the network interface the one or more of the switches of the computer network in order to follow an address of the second client device included in the second network traffic according to the switch-mapping and thereby determine that the second network traffic also originated from the source access-node; and
automatically determine the second client device to be at the known location within the establishment according to the mapping in the storage device; wherein the computer server does not receive any indication of the known location from the second client device.

12. The apparatus of claim 11, wherein the one or more processors are operable to query the one or more of the switches of the computer network in order to follow the address of the first client device and find the source access-node from which the first network traffic originated by performing the following steps:
(a) querying the first switch via the computer network to find a port of the first switch that has received network traffic from the address of the first client device;
(b) repeating step (a) when the port of the first switch found at step (a) is connected to a subsequent switch according to the switch-mapping, wherein upon repeating step (a) the first switch is redefined to be the subsequent switch; and
(c) determining the source access-node from which the first network traffic originated to be the port of the first switch found at step (a) when the port of the first switch found at step (a) is not connected to a subsequent switch according to the switch-mapping.

13. The apparatus of claim 11, wherein a user of the first client device inputs into the first client device the location identifier of the known location from which the first network traffic was transmitted for inclusion in the first network traffic.

14. The apparatus of claim 11, wherein the one or more processors are further operable to:
request confirmation from the first client device via the computer network to overwrite in the storage device an existing mapping of the source access-node to a location different than the known location; and
overwrite the existing mapping when storing the mapping of the source access-node to the known location in the storage device in response to receiving confirmation from the first client device.

15. The apparatus of claim 11, wherein the one or more processors are further operable to:
request confirmation from the first device via the computer network to delete in the storage device an existing mapping of a different access-node to the known location; and
delete the existing mapping in response to receiving confirmation from the first client device.

16. The apparatus of claim 11, wherein the establishment is a lodging establishment and the known location is a specific guest room within the lodging establishment.

17. The apparatus of claim 11, wherein:
the switch-mapping is stored in the storage device and the first network traffic is received during a network map learning phase; and
the second network traffic is received during a client device location detection phase that occurs after the network map learning phase is completed.

18. The apparatus of claim 11, wherein the one or more processors are further operable to:
provide a login portal to which new client devices at the establishment are directed before being granted access to a network service; and
grant access to the network service for the second client device without requiring a user of the second client device to enter any location identifier of the known location at the login portal.

19. The apparatus of claim 11, wherein the one or more processors are further operable to bill a folio associated with the known location to thereby charge for a network service provided to the second client device after automatically determining the second client device to be at the known location.

20. An apparatus comprising:
a network interface coupled to a computer network of an establishment;
a storage device; and
one or more processors coupled to the network interface and the storage device;
wherein the one or more processors are operable to:
query via the network interface a first switch of the computer network to determine which ports of the first switch are connected to other switches;
recursively query each of the other switches via the network interface to determine which ports of the other switches are connected to further switches;
store a corresponding switch-mapping in the storage device, the switch-mapping indicating how the ports of the switches are interconnected;
receive via the network interface first network traffic transmitted on the computer network by a first client device, determine a known location within the establishment from where first network traffic was transmitted;
query via the network interface one or more of the switches of the computer network according to the switch-mapping in order to follow an address of the first client device included in the first network traffic and thereby determine a source access-node of the computer network from which the first network traffic originated, wherein the source access-node is a port of a particular switch from which the first network traffic originated that is not connected to any other switch;
store a mapping of the source access-node to the known location in the storage device;
receive via the network interface second network traffic transmitted on the computer network, wherein the second network traffic is transmitted by a second client device and does not include any indication of the known location;
query via the network interface the one or more of the switches of the computer network in order to follow an address of the second client device included in the second network traffic according to the switch-mapping and thereby determine that the second network traffic also originated from the source access-node; and
automatically determine the second client device to be at the known location within the establishment according to the mapping in the storage device; wherein the computer server does not receive any indication of the known location from the second client device.

* * * * *